Patented Oct. 25, 1932

1,884,923

UNITED STATES PATENT OFFICE

ANNA CRESSWELL TURNER, OF RIVERDALE, MARYLAND

FRUIT DUFF AND METHOD OF PREPARING SAME

No Drawing.   Application filed January 2, 1931.   Serial No. 506,310.

This invention relates to a fruit duff or pudding and has for its general object the provision of a prepared mixture of ingredients requiring only the addition of sufficient moisture, prior to being cooked.

One of the more specific objects of the invention is to provide a ready-mixed dry composition containing the necessary fat, flour, seasoning and fruit, the latter in comminuted form, so prepared that the fruit particles are kept absolutely out of contact with the fat particles until the time for ultimate consumption, so that the full flavor of the fruit is perpetuated, and deterioration of the fruit through premature contact with the fat is avoided.

Another object of the invention resides in the novel method by which the fruit duff mixture is produced.

Other objects of the invention will appear as the following description of the method and the product eventuated therefrom proceeds.

It is known that fat in moist state readily rancidifies and that a cereal product such as flour which is in absorptive relation to moist fat, has its keeping properties greatly impaired. It is also known that if fruit is kept in contact with fat, it absorbs the fat resulting in deterioration in the flavor of the fruit and in rapid spoilage of the latter.

In deference to these two principles, I have in formulating the mixture of ingredients constituting my fruit duff, divided the flour content in at least two portions, and preferably three, in the first portion of which the fat alone is incorporated, sufficient flour being used in proportion to the fat to give a perfectly dry mixture, that is to say, a degree of dryness at which no absorption will take place from the mixture into any contiguous substance.

The desired quantity of fruit is then thoroughly comminuted and mixed with a second portion of flour, the purpose being to thoroughly cover the fruit particles with a buffer coating of flour so as to ensure that there will be no absorption by the fruit of the fat from the first mixture, when the two are mixed together.

If desired, the seasoning may be mixed with this second batch, but preferably the seasoning including any other ingredients which it may be desired to incorporate into the duff are independently mixed in the third batch or portion of flour.

The three mixtures are then thoroughly mixed together and packaged ready for distribution.

As an example, I may divide five pints of wheat flour into three batches. In the first batch of two pints I incorporate sixteen ounces of suet, working the fat into the flour until the mixture appears dry to the touch.

The second batch of one pint of flour is mixed with thirty-two ounces of the fruit which is to give the predominant flavor, the fruit being finely comminuted and mixed until each particle of fruit is thoroughly coated with a layer of flour.

In the third batch of three pints of flour I may mix one and one-half pounds of sugar, salt to taste, spices, and any other fruit which it may be desired to blend with the predominant flavor, the fruit being preferably finely ground. The three mixtures are then thoroughly stirred together.

It will be understood that the invention is not restricted to the use of any particular fruits or seasoning, and that it involves broadly the principle of mixing the fat with flour to dryness, segregated from the fruit, and providing the fruit particles with a buffer coating of flour before bringing it into intimate relation to the fat and flour mixture.

What I claim is:

Prepared fruit duff composition comprising a homogeneous admixture of two mixtures, one of the two mixtures comprising flour with which the necessary fat for shortening has been incorporated to a state of dryness, the other of the two mixtures comprising flour mixed with comminuted fruit so that each particle of the latter is covered with a buffer coating of flour.

In testimony whereof I affix my signature.

ANNA CRESSWELL TURNER.